(12) United States Patent
Van Steijn et al.

(10) Patent No.: US 10,743,553 B2
(45) Date of Patent: Aug. 18, 2020

(54) CONVEYING ASSEMBLY

(71) Applicant: Meyn Food Processing Technology B.V., Oostzaan (NL)

(72) Inventors: Aloysius Christianus Maria Van Steijn, Oostzaan (NL); Joy David Mike Van Spall, Oostzaan (NL)

(73) Assignee: Meyn Food Processing Technology B.V., Oostzaan (NL)

( * ) Notice: Subject to any disclaimer, the term of this patent is extended or adjusted under 35 U.S.C. 154(b) by 0 days.

(21) Appl. No.: 16/525,632

(22) Filed: Jul. 30, 2019

(65) Prior Publication Data

US 2020/0037624 A1 Feb. 6, 2020

(30) Foreign Application Priority Data

Aug. 6, 2018 (NL) .................................... 2021431

(51) Int. Cl.
*A22C 21/00* (2006.01)
*B65G 17/20* (2006.01)

(52) U.S. Cl.
CPC .......... *A22C 21/0053* (2013.01); *B65G 17/20* (2013.01); *B65G 2201/0202* (2013.01)

(58) Field of Classification Search
CPC ............ B65G 17/20; B65G 2201/0202; A22C 21/0053
See application file for complete search history.

(56) References Cited

U.S. PATENT DOCUMENTS

| 3,416,186 | A |   | 12/1968 | Zebarth et al. |              |
|-----------|---|---|---------|----------------|--------------|
| 3,643,293 | A | * | 2/1972  | Rejsa          | A22C 21/0053 |
|           |   |   |         |                | 452/182      |
| 3,750,231 | A |   | 8/1973  | Schreuder      |              |
| 4,570,295 | A | * | 2/1986  | van Mil        | A22C 21/0053 |
|           |   |   |         |                | 452/182      |
| 4,709,448 | A |   | 12/1987 | McGuire et al. |              |
| 4,951,353 | A | * | 8/1990  | Tieleman       | A22C 21/0023 |
|           |   |   |         |                | 452/167      |
| 4,964,194 | A | * | 10/1990 | Kessler        | A22C 21/0023 |
|           |   |   |         |                | 452/167      |
| 9,775,695 | B2 | * | 10/2017 | Erickson      | A61D 1/005   |
| 2001/0034200 | A1 | * | 10/2001 | Clark       | A22C 21/0053 |
|           |   |   |         |                | 452/106      |
| 2008/0171506 | A1 | * | 7/2008  | Nieuwelaar  | A22C 21/00   |
|           |   |   |         |                | 452/167      |
| 2014/0194042 | A1 |   | 7/2014  | Bakker        |              |
| 2016/0278395 | A1 | * | 9/2016  | Van Steijn    | A22C 21/0007 |

FOREIGN PATENT DOCUMENTS

EP 2818050 A2 * 12/2014 ......... A22C 21/0015

OTHER PUBLICATIONS

PCT Search Report for application NL 2021431, dated Aug. 6, 2018.

* cited by examiner

*Primary Examiner* — Mark A Deuble
(74) *Attorney, Agent, or Firm* — Dority & Manning, P.A.

(57) ABSTRACT

Conveying assembly with overhead conveyor having shackles for suspending poultry carcasses by the legs with each shackle suspended from a hanger. A guide element may be disposed generally below and parallel to the overhead conveyor to prevent rotation of the shackles about a vertical axis. The guide element may be movable in the conveying direction and the stops can be mounted on the guide element.

7 Claims, 1 Drawing Sheet

CONVEYING ASSEMBLY

PRIORITY STATEMENT

The present application claims priority under 35 U.S.C. § 119 to Dutch Application No. 2021431, filed Aug. 6, 2018.

FIELD OF THE INVENTION

The subject matter of the present disclosure relates generally to a conveying assembly having an overhead conveyor embodied with shackles for suspending poultry carcasses by the legs and for transportation of the poultry carcasses in a conveying direction.

BACKGROUND OF THE INVENTION

A conveying assembly is shown in EP-B-2 818 050, which discloses a stationary guide element provided below and parallel to an overhead conveyor for the avoidance of rotation around an essentially vertical axis. Stops are mounted on a guide chain disposed generally horizontally below and essentially parallel to the overhead conveyor. A guide chain moves synchronously with the drive chain. The stops engage the shackles from which the poultry carcasses are suspended to prevent rotation of the shackles about the essentially horizontal rotation axis.

Such conveying assembly suffers from several drawbacks and disadvantages. For one the known conveying assembly is relatively complicated. Another drawback is that the stops engage the trailing part of the shackles as seen in the conveying direction. This is disadvantageous in view of the close proximity of adjacent shackles, wherein the shackle pitch is about 6 inch or 152.4 mm, whereas the outside shackle dimension is approximately 130 mm, leaving only 22.4 mm between adjacent shackles. In this narrow space the stops must be accurately positioned which is a hard task in a fast-moving shackle train. Accordingly the prior art conveying assembly is prone to misalignment, particularly when the approaching shackles are swinging.

Another disadvantage is that the guide chain usually moves around guide wheels, which causes—at the location of the outfeed near any such guide wheel—that the stops have difficulty to disengage from the shackles.

Yet another disadvantage is that even when the shackles are stabilized and prevented from rotation around a vertical and around a horizontal axis, this does not guarantee that also the poultry carcasses are prevented from such movements. The reason for that is that from a mechanical point of view a suspended poultry carcass can be modelled as a series of hinge points at ankle, knee and hip joint, that are interconnected by poultry bones.

U.S. Pat. No. 3,750,231 discloses a conveying assembly with shackles from which poultry is suspended by the legs. The shackles are positioned accurately by spaced blocks in an endless chain that is driven in the direction of product flow along the conveyor. The spaced blocks evenly space the shackles for properly receiving the carcasses.

U.S. Pat. No. 4,709,448 discloses a conveying in which the guide element is movable in the conveying direction and the stops are mounted on the guide element, wherein the guide element is provided below the shackles so as to arrange that the stops are able to engage the legs of the poultry carcasses suspended from the shackles. This feature avoids a separate stationary guide element for the avoidance of the rotation around an essentially vertical axis, by merging the functionality of this stationary guide element with the functionality of the moving stops that prevent rotation around an essentially horizontal axis. These functionalities are merged into a single movable guide element on which the stops are mounted. The feature of engaging the legs of the poultry carcasses arranges that rather than merely stabilizing the shackles, the poultry carcasses themselves are stabilized and prevented from rotation around either a vertical rotation axis or horizontal rotation axis. At the outfeed the stops are also better equipped to disengage from the poultry legs that are relatively flexible in comparison with the shackle material.

BRIEF DESCRIPTION OF THE INVENTION

In one exemplary aspect, the invention has as an objective to prevent or at least alleviate some or all of the drawbacks and disadvantages of the prior art conveying assemblies, and for this purpose the conveying assembly of the invention is embodied with the features of one or more of the appended claims.

In one exemplary embodiment, the subject matter of the present disclosure relates generally to a conveying assembly having an overhead conveyor embodied with shackles for suspending poultry carcasses by the legs and for transportation of the poultry carcasses in a conveying direction. For this exemplary embodiment, the overhead conveyor includes a track and a series of trolleys suspended from the track, the trolleys being interconnected by a drive chain, wherein each trolley includes a hanger projecting downwardly and wherein each hanger is provided with a single one of the shackles suspended from the hanger. The conveying assembly can further include a guide element disposed generally horizontally below and essentially parallel to the overhead conveyor to prevent rotation of the shackles about an essentially vertical axis. The conveying assembly can further include stops to prevent rotation of the shackles about an essentially horizontal rotation axis.

Stops can be provided on the guide element in a one-to-one relation with the shackles such that each stop is able to engage a leading leg of a poultry carcass as seen in the conveying direction. This arrangement is less sensitive to misalignment since the entire width between the poultry legs suspended from a shackle (approximately 75 mm in one embodiment) is available for initial placement of the stops in an arriving train of shackles.

Suitably each stop can engage a leg of a poultry carcass between an ankle joint and a knee joint of such leg. Suitably the guide element can be synchronously movable with the drive chain. The stops can protrude sideways extending away from the guide element.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

Exemplary embodiments of the invention will hereinafter be further elucidated with reference to the following figures.

Whenever in the figures the same reference numerals are applied, these numerals refer to the same parts.

DETAILED DESCRIPTION OF THE INVENTION

Figure 1:
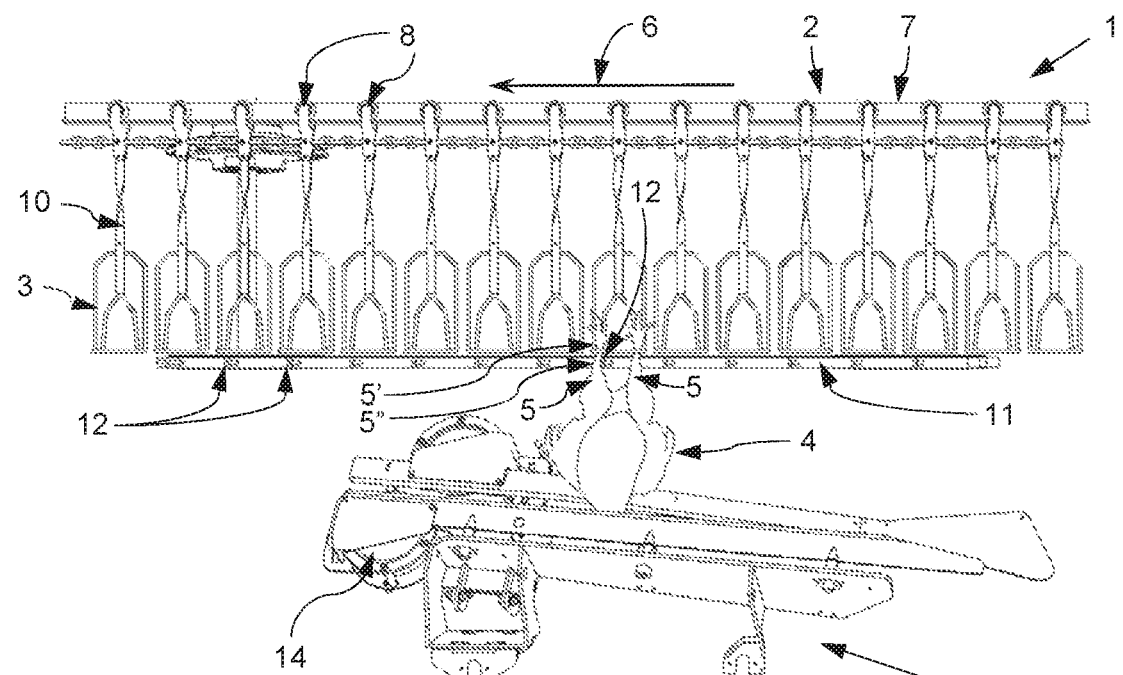
FIG. 1 shows a side view at a conveying assembly according to an exemplary embodiment of the invention.

For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents With reference to both FIG. 1 and FIG. 2 the conveying assembly of this exemplary embodiment of the invention is generally denoted with reference 1. This exemplary conveying assembly 1 includes an overhead conveyor 2 embodied with shackles 3 for suspending poultry carcasses 4 by the legs 5 and for transportation of the poultry carcasses 4 in a conveying direction as indicated with arrow 6.

The overhead conveyor 2 comprises a track 7 and a series of trolleys 8 suspended from the track 7, the trolleys being interconnected by a drive chain 9. Each trolley 8 includes a hanger 10 projecting downwardly and each hanger 10 is provided with a single one of the shackles 3 suspended from the hanger 10.

The conveying assembly 1 further includes a guide element 11 disposed generally horizontally below and essentially parallel to the overhead conveyor 2 to prevent rotation of the shackles 3 and the poultry carcasses 4 suspended therefrom about an essentially vertical axis. The exemplary conveying assembly 1 further includes stops 12 to prevent rotation of the shackles 3 and undesirable movement of the poultry carcasses 4 suspended therefrom about an essentially horizontal rotation axis.

The guide element 11 is movable in the conveying direction 6 and it shows that the stops 12 are mounted on the guide element 11. The guide element 11 is synchronously movable with the drive chain 9. It shows further that the stops 12 protrude sideways extending away from the guide element 11.

Figure 2:
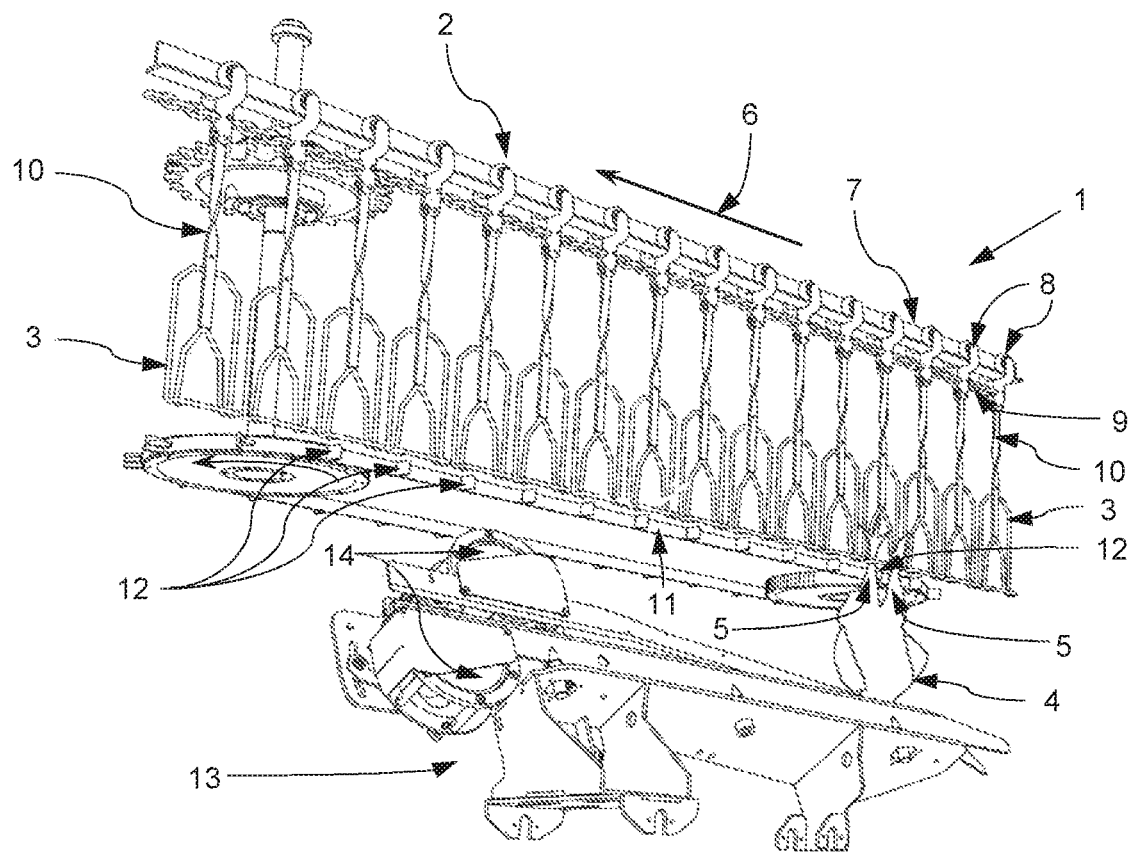
FIG. 2 shows an isometric view of the exemplary conveying assembly of FIG. 1.

FIGS. 1 and 2 show the guide element 11 can be provided below the shackles 3 so as to arrange that the stops 12 are able to engage the legs 5 of the poultry carcasses 4 suspended from the shackles 3. The stops 12 are provided on the guide element 11 in a one-to-one relation with the shackles 3 such that each stop 12 is able to engage a leading leg 5 of a poultry carcass 5 as seen in the conveying direction 6. Each stop 12 engages a leg 5 of a poultry carcass 4 between an ankle joint 5' and a knee joint 5" of such leg 5.

The conveying assembly 1 of this exemplary embodiment of the invention is particularly, although not exclusively, suitable for application in combination with a processing plant, such as for killing the poultry. For this purpose, both FIG. 1 and FIG. 2 show an apparatus 13 for guiding the necks of the poultry carcasses 4 to a cutting arrangement 14 for cutting the veins in the necks of the poultry carcasses 4. It is also possible to apply a circular knife for decapitating the poultry carcasses.

Although the invention has been discussed in the foregoing with reference to an exemplary embodiment of the conveying assembly of the invention, the invention is not restricted to this particular embodiment which can be varied in many ways without departing from the invention. The discussed exemplary embodiment shall therefore not be used to construe the appended claims strictly in accordance therewith. On the contrary the embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment.

The invention claimed is:

1. A conveying assembly for conveying poultry carcasses along a conveying direction, comprising
    an overhead conveyor embodied with shackles for suspending poultry carcasses by the legs and for transportation of the poultry carcasses in a conveying direction, the overhead conveyor comprising a track;
    a series of trolleys suspended from the track, the trolleys being interconnected by a drive chain, wherein each trolley comprises a hanger projecting downwardly and wherein each hanger is provided with a single one of the shackles suspended from the hanger;
    a guide element disposed generally horizontally below and essentially parallel to the overhead conveyor and configured to prevent rotation of the shackles about an essentially vertical axis; and
    a plurality of stops to prevent rotation of the shackles about an essentially horizontal rotation axis;
    wherein the guide element is movable in the conveying direction and the stops are mounted on the guide element, and wherein the guide element is provided below the shackles so as to arrange that the stops are able to engage the legs of the poultry carcasses suspended from the shackles, wherein the stops are provided on the guide element in a one-to-one relation with the shackles such that each stop engages only a leading leg of a poultry carcass along the conveying direction.

2. The conveying assembly according to claim 1, wherein each stop engages a leg of a poultry carcass between an ankle joint and a knee joint of such leg.

3. The conveying assembly according to claim 1, wherein the guide element is synchronously movable with the drive chain.

4. The conveying assembly according to claim 1, wherein the stops protrude sideways extending away from the guide element.

5. A conveying assembly for poultry carcasses, the conveying assembly having a conveying direction, the conveying assembly comprising:
    an overhead conveyor including a track;
    a plurality of trolleys suspended from the track and interconnected with each other, wherein each trolley comprises a hanger projecting downwardly form the trolley;
    a plurality of shackles for suspending poultry carcasses by their legs and for transporting the poultry carcasses along the conveying direction, each shackle suspended from one of the hangers;
    a guide element positioned below the overhead conveyor and the plurality of shackles, the guide element moving in the conveying direction in synchronization with the overhead conveyor, a plurality of stops supported by the guide elements, each stop provided in a one-to-one relationship each hanger and configured to prevent rotation of the shackles, wherein each stop is arranged to engage a leading leg only of one of the poultry carcasses along the conveying direction.

6. The conveying assembly according to claim 5, wherein the stops protrude sideways and extend away from the guide element.

7. The conveying assembly according to claim 5, wherein each stop engages a leg of a poultry carcass between an ankle joint and a knee joint of such leg.

\* \* \* \* \*